(12) United States Patent  
Meinecke (10) Patent No.: US 11,092,381 B2  
(45) Date of Patent: Aug. 17, 2021

(54) OXIDATION FURNACE

(71) Applicant: EISENMANN SE, Boeblingen (DE)

(72) Inventor: Lars Meinecke, Reutlingen (DE)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 15/319,985

(22) PCT Filed: Jun. 16, 2015

(86) PCT No.: PCT/EP2015/001214  
§ 371 (c)(1),  
(2) Date: Dec. 19, 2016

(87) PCT Pub. No.: WO2015/192961  
PCT Pub. Date: Dec. 23, 2015

(65) Prior Publication Data  
US 2017/0122664 A1 May 4, 2017

(30) Foreign Application Priority Data  
Jun. 20, 2014 (DE) .................. 10 2014 009 243

(51) Int. Cl.  
*F27B 9/28* (2006.01)  
*G01F 1/46* (2006.01)  
(Continued)

(52) U.S. Cl.  
CPC .............. *F27B 9/28* (2013.01); *D01F 9/32* (2013.01); *D02J 13/00* (2013.01); *D02J 13/001* (2013.01);  
(Continued)

(58) Field of Classification Search  
CPC ...... D01F 9/32; G01F 1/46; F27D 2019/0068; F27D 2019/0078; F27M 2001/15; F27B 9/28; D02J 13/00; D02J 13/001  
See application file for complete search history.

(56) References Cited

U.S. PATENT DOCUMENTS 4,395,232 A * 7/1983 Koch ................. A21B 1/28  
432/32  
4,545,762 A * 10/1985 Arita .................. D01F 9/32  
358/300  
(Continued)

FOREIGN PATENT DOCUMENTS

DE 697 20 297 T2 1/2004  
DE 10 2010 044 296 B3 1/2012  
(Continued)

*Primary Examiner* — Steven S Anderson, II  
(74) *Attorney, Agent, or Firm* — Schroeder Intellectual Property Law Group, LLC (57) ABSTRACT

An oxidation furnace for the oxidative treatment of fibers having a housing which is gas-tight, apart from passage areas for the fibers, and a process chamber located in the interior of the housing. A hot working atmosphere can be generated by an atmosphere-generating device, can be blown into the process chamber and flows through the process chamber in processing conditions in a main direction of flow. Deflecting rollers guide the fibers through the process chamber in a serpentine manner in such a way that the fibers lie next to one another as a fiber carpet (22*a*), wherein the fiber carpet spans a plane between opposite deflecting rollers. A flow measuring system is provided, by means of which a flow profile of the working atmosphere in processing conditions can be generated, and which comprises at least one sensor system for determining the speed of flow, the sensor system being arranged in a sensor region between two adjacent fiber carpets.

20 Claims, 11 Drawing Sheets (51) Int. Cl.
*D01F 9/32* (2006.01)
*D02J 13/00* (2006.01)
*F27D 19/00* (2006.01)

(52) U.S. Cl.
CPC ........ *G01F 1/46* (2013.01); *F27D 2019/0068* (2013.01); *F27D 2019/0078* (2013.01); *F27M 2001/15* (2013.01)

(56) References Cited

U.S. PATENT DOCUMENTS

| | | | | |
|---|---|---|---|---|
| 5,853,429 | A * | 12/1998 | Heine | .................... D01F 9/225 8/115.54 |
| 5,908,290 | A | 6/1999 | Kawamura et al. | |
| 6,007,465 | A | 12/1999 | Kawamura et al. | |
| 6,564,651 | B1 * | 5/2003 | Bowers | .................... G01F 1/46 73/861.66 |
| 6,776,611 | B1 * | 8/2004 | Sprague | .................... D01F 9/32 432/242 |
| 8,955,235 | B2 | 2/2015 | Berner | |
| 9,139,936 | B2 | 9/2015 | Meinecke et al. | |
| 9,303,921 | B2 | 4/2016 | Berner | |
| 9,441,881 | B2 | 9/2016 | Berner | |
| 10,222,122 | B2 | 3/2019 | Berner et al. | |
| 2002/0178837 | A1 * | 12/2002 | Brandt, Jr. | ................ G01F 1/44 73/861.63 |
| 2003/0062908 | A1 * | 4/2003 | Venter | .................. G01N 27/223 324/661 |
| 2010/0189627 | A1 * | 7/2010 | Hu | .......................... D01F 9/32 423/445 R |
| 2013/0167397 | A1 | 7/2013 | Bagwell et al. | |
| 2013/0171578 | A1 | 7/2013 | Berner | |
| 2014/0009174 | A1 * | 1/2014 | Youssi | ................. G01N 27/223 324/665 |
| 2014/0026437 | A1 | 1/2014 | Meinecke et al. | |
| 2015/0090050 | A1 * | 4/2015 | Wiklund | ................... G01F 1/46 73/861.65 |
| 2015/0090182 | A1 * | 4/2015 | Sato | ........................ C23C 2/06 118/712 |
| 2016/0369427 | A1 * | 12/2016 | Mizuno | ..................... D01F 9/32 |
| 2017/0145598 | A1 | 5/2017 | Meinecke | |
| 2019/0194830 | A1 | 6/2019 | Meinecke | |
| 2020/0181809 | A1 | 6/2020 | Muck et al. | |
| 2021/0048249 | A1 | 2/2021 | Muck | |

FOREIGN PATENT DOCUMENTS

| | | |
|---|---|---|
| DE | 10 2011 010 298 B3 | 6/2012 |
| JP | H9-101186 | 4/1997 |
| JP | 2002-105766 | 4/2002 |
| JP | 2004-294147 | 10/2004 |
| JP | 2006-57222 | 3/2006 |
| JP | 2009-41165 | 2/2009 |

* cited by examiner

OXIDATION FURNACE

RELATED APPLICATIONS

The present application is a national phase of International Patent Application No. PCT/EP2015/001214, filed Jun. 16, 2015, which claims the filing benefit of German Patent Application No. 10 2014 009 243.7, filed Jun. 20, 2014, the contents of both of which are incorporated herein by reference.

FIELD OF THE INVENTION

The invention relates to an oxidation furnace for the oxidative treatment of fibers, in particular for the production of carbon fibers, the oxidation furnace having
  a) a housing which except for passage regions for the fibers is gas tight;
  b) a process chamber which is located in the interior of the housing;
  c) an atmosphere generating installation by way of which a hot operating atmosphere is generatable and capable of being blown into the process chamber, which hot operating atmosphere under process conditions perfuses the process chamber in a main flow direction;
  d) deflection rollers which guide the fibers in a serpentine manner such that they lie beside one another in the form of a fiber carpet through the process chamber, wherein the fiber carpet defines a plane between respective mutually opposite deflection rollers.

BACKGROUND OF THE INVENTION

In the case of commercially available oxidation furnaces of this type for the production of carbon fibers there are substantially two process parameters that chiefly influence the quality of the obtained fibers. On the one hand, this is the temperature in the process chamber, that is to say thus the temperature of the operating atmosphere; on the other hand, this is the velocity at which the operating atmosphere perfuses the process chamber.

These two process parameters should be maintained within tight tolerances according to process standards across the entire process procedure, so as to guarantee both consistent fiber quality as well as high process reliability.

To date, a flow profile over the flow velocity of the operating atmosphere in the process chamber was established in the cold operating state of the oxidation furnace, for example when commissioning the latter. Proceeding from this "cold profile", a flow profile under process conditions was computed.

The temperature in the process chamber of an oxidation furnace under process conditions is up to 300° C., and toxic and/or combustible gases, as well as $SiO_2$ particles and fiber particles, are released. Moreover, in the case of a non-uniform thermal distribution in the process chamber, a formation of tar condensate may arise in cooler regions. Practical experience has demonstrated that also by way of changes to the conditions in the process chamber from the state of commissioning to the running process, large deviations between the computed flow profile and the flow profile that is actually experienced under process conditions may arise such that the quality of the fiber does not always meet the expectations.

SUMMARY OF THE INVENTION

It is an object of the invention to provide an oxidation furnace of the type mentioned at the outset, that takes account of these considerations.

This object may be achieved in the case of an oxidation furnace of the type mentioned at the outset in that
  a flow measurement system is present by means of which under process conditions a flow profile of the operating atmosphere is establishable and which for determining the flow velocity comprises at least one sensor installation which is disposed in a sensor region between two adjacent fiber carpets.

The invention is based on the insight that it is possible for a sensor system to be set up that withstands the process conditions in the process chamber and reliably supplies data pertaining to the flow velocities of the operating atmosphere also in the running process under process conditions.

In principle, a flow profile in the direction that is perpendicular to the fiber carpets, that is to say typically across the vertical of the process chamber, is to be established. In this case, a plurality of sensor regions are provided in the vertical direction. However, the sensor installation is preferably adapted in such a manner that dissimilar flow velocities of the operating atmosphere in the sensor region that are transverse to the main flow direction are detectable. If and when a plurality of such sensor installations are distributed in the vertical direction, a grid-based flow profile of high information content across the cross section of the process chamber may be established.

It has found to be particularly effective under process conditions for the at least one sensor installation to be configured as a differential-pressure sensor installation.

It is of advantage herein for the at least one differential-pressure sensor installation to comprise a pitot probe and a probe for the static pressure.

A particularly advantageous configuration of the sensor installation is achieved if and when
  a) the pitot probe comprises at least one pitot tube having a closed end and a measurement end, and the probe for the static pressure comprises at least one reference tube having a closed end and a measurement end, wherein a back pressure and a static reference pressure are detectable at the measurement ends;
  b) the pitot tube and the reference tube in the sensor region extend so as to be transverse to the main flow direction of the operating atmosphere and so as to be mutually parallel at a measurement spacing;
  c) the pitot tube has openings and is disposed such that the openings point in the direction that is counter to the main flow direction of the operating atmosphere;
  d) the reference tube has openings and in the main flow direction of the operating atmosphere is disposed behind the pitot tube such that the openings point away from the pitot tube.

In order to reduce turbulences on the differential-pressure sensor installation, it is favorable for the latter to comprise an encapsulation which shrouds the pitot tube and the reference tube, except from the openings thereof.

With a view to a grid-based flow profile as has been alluded to above, it is advantageous for the pitot probe to comprise a plurality of measurement portions, and for the probe for the static pressure to comprise a plurality of measurement portions.

Preferably, the measurement portions are configured by measurement chambers which each at their end side that is remote from the closed end by way of a hollow line open into measurement connectors at the measurement end.

A symmetrical construction is achieved if and when the hollow lines run in a manner that is mutually coaxial and coaxial with the measurement chambers.

Alternatively, the measurement portions may be configured in that a plurality of pitot tubes or of reference tubes are present that are of dissimilar length and are disposed so as to bear on one another in such a manner that in each case one measurement portion lies at the closed end of the respective pitot tube or reference tube having openings in the process chamber.

The plurality of pitot tubes or of reference tubes may be rectilinear or angular. If and when said pitot tubes or reference tubes are angular, they may be nested in such a manner that the flow is offered an impact face that is largely without any step or the like, such that turbulences are avoided.

If and when at least one sensor assembly having a plurality of sensor installations which are disposed in a plurality of sensor regions between dissimilar adjacent fiber carpets is present, a profile in the direction that is perpendicular to the fiber carpets, thus typically in the vertical direction, may advantageously be established.

If and when at least one sensor assembly having a plurality of sensor installations which are disposed in adjacent sensor zones of one sensor region is present, the flow profile in the flow direction may be refined.

If and when a plurality of sensor installations by way of a valve installation are connected to a group measurement unit and are sequentially evaluatable, a large number of pressure-measurement units and pressure transducers may be saved. In this case, a flow profile is successively built up in that a plurality of sensor installations are read in a temporally sequential manner, and the obtained values are assembled to form a flow profile.

With a view to current flow concepts it is favorable for the process chamber to have a plurality of process chamber portions in which the operating atmosphere flows with dissimilar main flow directions, wherein the flow profile of each of the latter is separately establishable by the flow measurement system. This takes into account the so-called "center-to-end" principle in oxidation furnaces, for example.

In order for the flowing operating atmosphere to be directed in a targeted manner to a sensor installation, it is favorable for air directing elements by way of which the operating atmosphere is bundled in the direction toward the sensor installation to be disposed in a sensor region between two adjacent fiber carpets.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention will be explained in more detail hereunder by means of the drawings in which.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
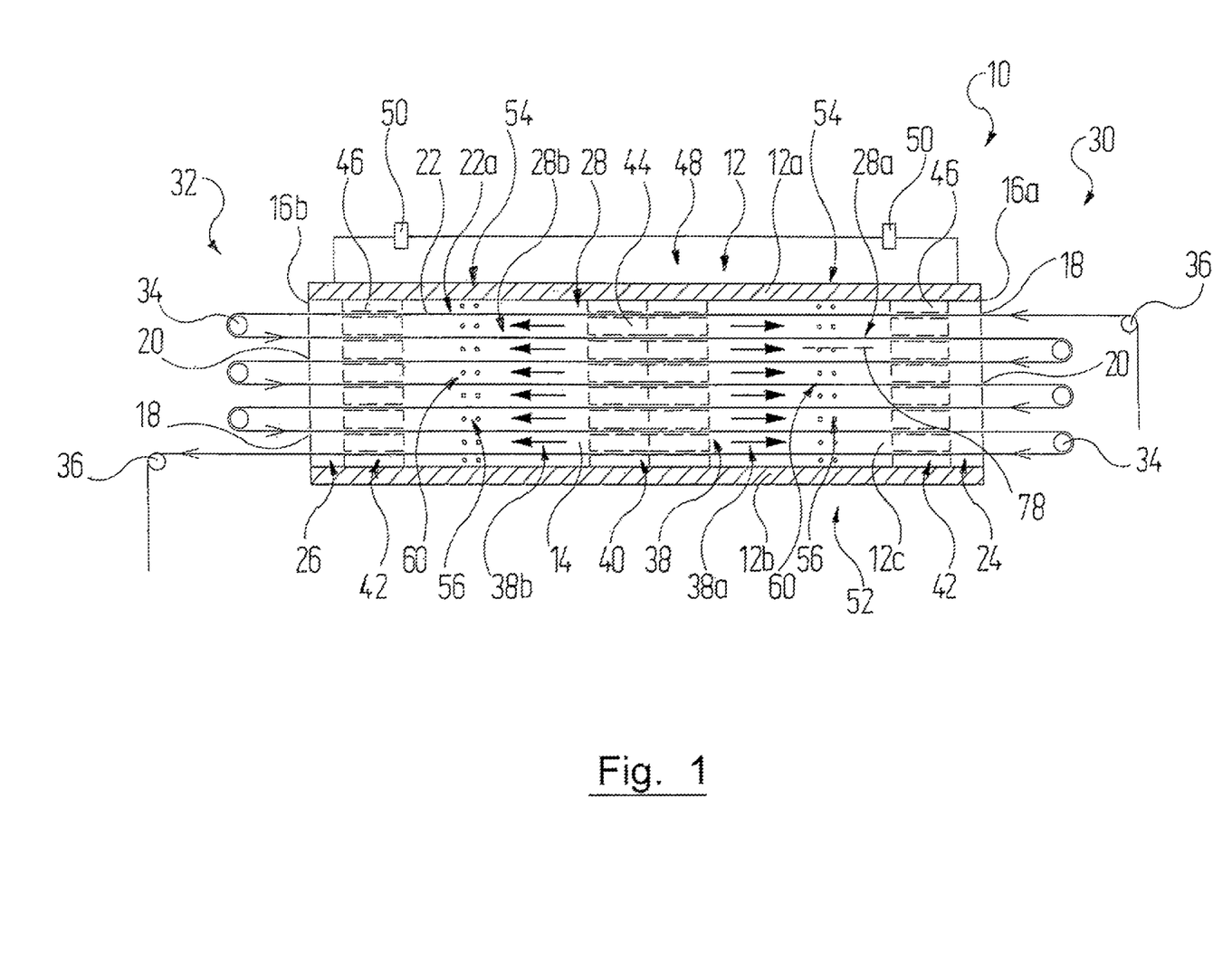
FIG. 1 shows a vertical section through an oxidation furnace for producing carbon fibers, in the longitudinal direction of the furnace, with a flow measurement system which comprises a sensor assembly having a plurality of differential-pressure sensor installations.

Reference is first made to FIG. 1 which shows a vertical section of an oxidation furnace which is employed for producing carbon fibers and is overall identified with 10.

The oxidation furnace 10 comprises a housing 12 which by way of a ceiling wall 12a and a floor wall 12b and two vertical longitudinal walls, of which only one longitudinal wall 12c that lies behind the section plane is visible in FIG. 1, delimits a passage chamber that forms the interior 14 of the oxidation furnace 10.

At each of its end sides the housing 12 has one end wall 16a, 16b, wherein horizontal entry slots 18 and exit slots 20 are present in an alternating manner from top to bottom in the end wall 16a, and horizontal exit slots 20 and entry slots 18 are present in an alternating manner from top to bottom in the end wall 16b, said slots for the sake of clarity not all having a reference sign. Fibers 22 are guided into the interior 14 and out of the latter again through the entry and exit slots 18 and 20, respectively. The entry and exit slots 18, 20 generally form passage regions of the housing 12 for the carbon fibers 22. Except for these passage regions, the housing 12 of the oxidation furnace 10 is gas tight.

The interior 14 in turn in the longitudinal direction is subdivided into three regions and comprises a first antechamber 24 which is disposed directly next to the end wall 16a, a second antechamber 26 which is directly adjacent to the opposite end wall 16b, and a process chamber 28 which is located between the antechambers 24, 26.

In this way, the antechambers 24 and 26 simultaneously form an entry and exit lock for the fibers 22 into the interior 14 and the process chamber 28, respectively.

The fibers 22 to be treated are fed to the interior 14 of the oxidation furnace 10 so as to run in parallel as a type of fiber carpet 22a. To this end, the fibers 22, from a first deflection region 30 which lies next to the end wall 16a, outside the furnace housing 12, through the topmost entry slot 18 in the end wall 16a enter the first antechamber 24. The fibers 22 are thereafter guided through the process chamber 28 and through the second antechamber 26 to a second deflection region 32 which lies next to the end wall 16b, outside the furnace housing 12, and from there back again.

In total, the fibers 22 pass through the process chamber 28 in a serpentine manner by way of deflection rollers 34 which are sequential from the top to the bottom, and of which only two have a reference sign. In the case of the present exemplary embodiment, three deflection rollers 34 that by way of their axes lie in parallel on top of one another are provided in each of the deflection regions 30, 32. The fiber carpet 22a, which is formed by the multiplicity of fibers 22 that run beside one another, defines a plane between each of the deflection rollers 34. The running pattern of the fibers may also be performed from the bottom to the top, and there may also be more or fewer planes defined than are shown in FIG. 1.

After the entire passage through the process chamber 28, the fibers 22 exit the oxidation furnace 10 through the lowermost exit slot 20 in the end wall 16b. Prior to reaching the topmost entry slot 18 in the end wall 16a, and after exiting the oxidation furnace through the lowermost exit slot 20 in the end wall 16b, the fibers 22 outside the furnace housing 12 are guided by way of further guide rollers 36.

The process chamber 28 under process conditions is perfused by a hot operating atmosphere 38, wherein there are two opposing hot air streams 38a, 38b, each having a main flow direction that is visualized by arrows, in the present exemplary embodiment, on account of which the process chamber 28 in terms of flow technology is divided into two process chamber portions 28a, 28b. To this end, a blower installation 40 is disposed in the central region of the process chamber 28, and one suction installation 42 is disposed in each of the two outboard end regions of the process chamber 28, each of said suction installations 42 being adjacent to the antechambers 24, 26, respectively. The blower installation 40 comprises a plurality of blower boxes 44, and the suction installations 42 comprise a plurality of suction boxes 46, which in each case are disposed between the planes that are defined by the fiber carpet 22a and which extend between the vertical longitudinal walls of the furnace housing 12.

Proceeding, for example, from the suction installations 42, the air is conveyed into an air directing chamber 48, lying behind the drawing plane in FIG. 1, in which said air is prepared and conditioned in a manner of no further interest herein, wherein in particular the temperature of said air is set by way of heating apparatuses (not separately shown here).

From the air directing chamber 48, the air in each case reaches the blower installation 40. The latter releases the air that is now recirculated and conditioned in a counterflowing manner into the process chamber portions 28a, 28b in the direction toward the deflection regions 30 and 32. Therein, the air streams 38a, 38b flow in an opposing manner to the suction installations 42, this being visualized in FIG. 1 by respective arrows. Thus, a total of two recirculating air circuits are closed, and the oxidation furnace 10 in terms of flow technology is operated on the above-mentioned "center-to-end" principle. However, all other known flow principles may also be implemented.

Generally speaking, the blower installation 40 and the suction installations 32, collectively with the air directing chamber 48 and any present conditioning installations, form an atmosphere generating installation by way of which a hot operating atmosphere 38 may be generated and blown into the process chamber 28, said hot operating atmosphere 38 under process conditions perfusing the process chamber 28.

The fibers 22 during the serpentine passage through the process chamber 28, are thus bathed in hot oxygen-containing air, and herein are oxidated. The precise configuration of both the blower installation 40 as well as of the suction installations 42 are presently of no further relevance.

Moreover, two outlets 50 are provided in the region of the air directing chamber 48. Those volumes of gas or air, respectively, that are either created in the oxidation process, or that reach the process chamber 28 as fresh air through a supply air installation (not separately shown here), may be dischared by way of said outlets 50, so as to maintain the balance of air in the oxidation furnace 10. The discharged gases, which may also contain toxic components, are fed to thermal post-combustion. The heat that is potentially recovered herein may be used at least for pre-heating the fresh air that is fed to the oxidation furnace 10.

The oxidation furnace 10 comprises a flow measurement system 52 by way of which a flow profile of the operating atmosphere 38 in the process chamber 28 may be established under process conditions. To this end, the flow measurement system 52 comprises at least one sensor assembly 54 having a plurality of sensor installations 56 that are located in the process chamber 28 and are usable under process conditions, for determining the flow velocity.

In the case of the present exemplary embodiment, one such sensor assembly 54 is provided in each process chamber portion 28a, 28b of the process chamber 28, and the flow measurement system 52 may in each case separately establish the flow profile of the operating atmosphere 38 that perfuses the process chamber portions 28a, 28b with dissimilar main flow directions.

Hereunder, only the sensor assembly 54 in the chamber portion 28a of the process chamber 28 will be explained; the statements made to this end correspondingly apply analogously to the process chamber portion 28b.

A sensor region 58, in each of which one sensor installation 56 by means of which the flow velocity of the air stream 38a in this sensor region 58 may be detected is disposed, is defined in each intermediate space between two adjacent fiber carpets 22a. Each of the sensor installations 56 is configured as a differential-pressure sensor installation 60.

Figure 2:
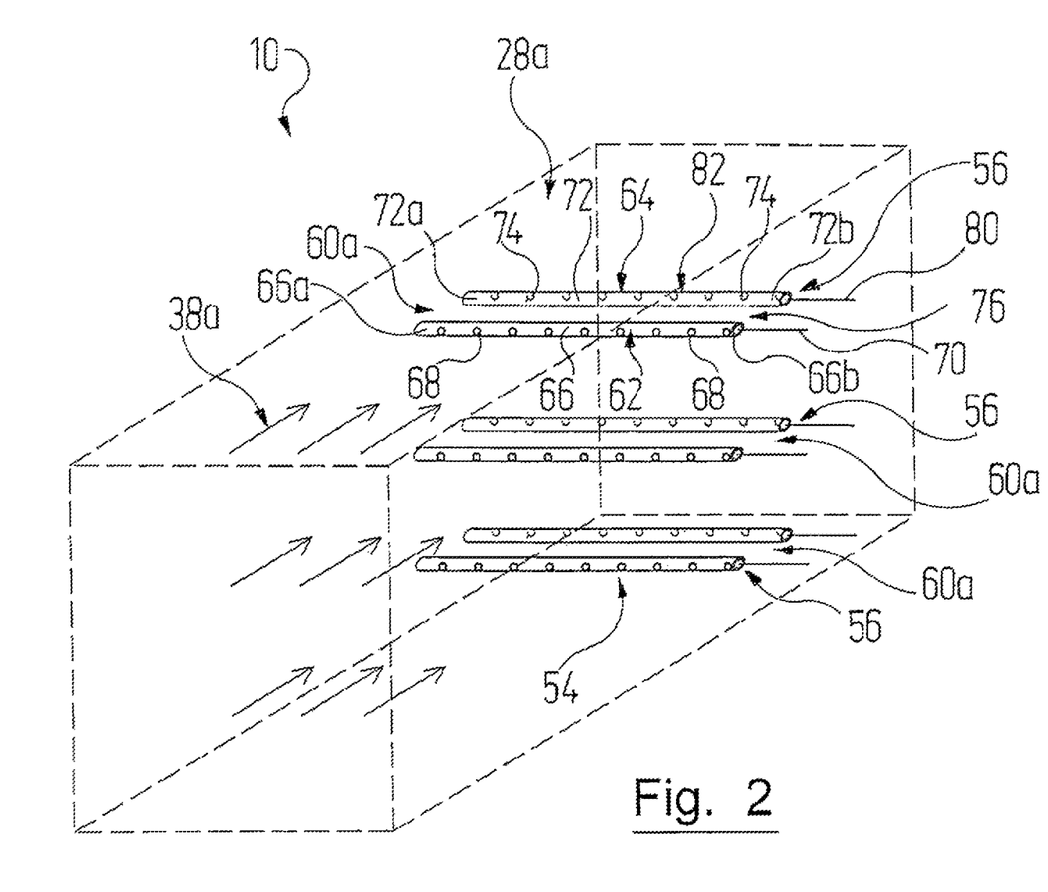
FIG. 2 shows a perspective fragment of a detail of the sensor assembly of the oxidation furnace, having differential-pressure sensor installations according to a first exemplary embodiment.
Figure 3:
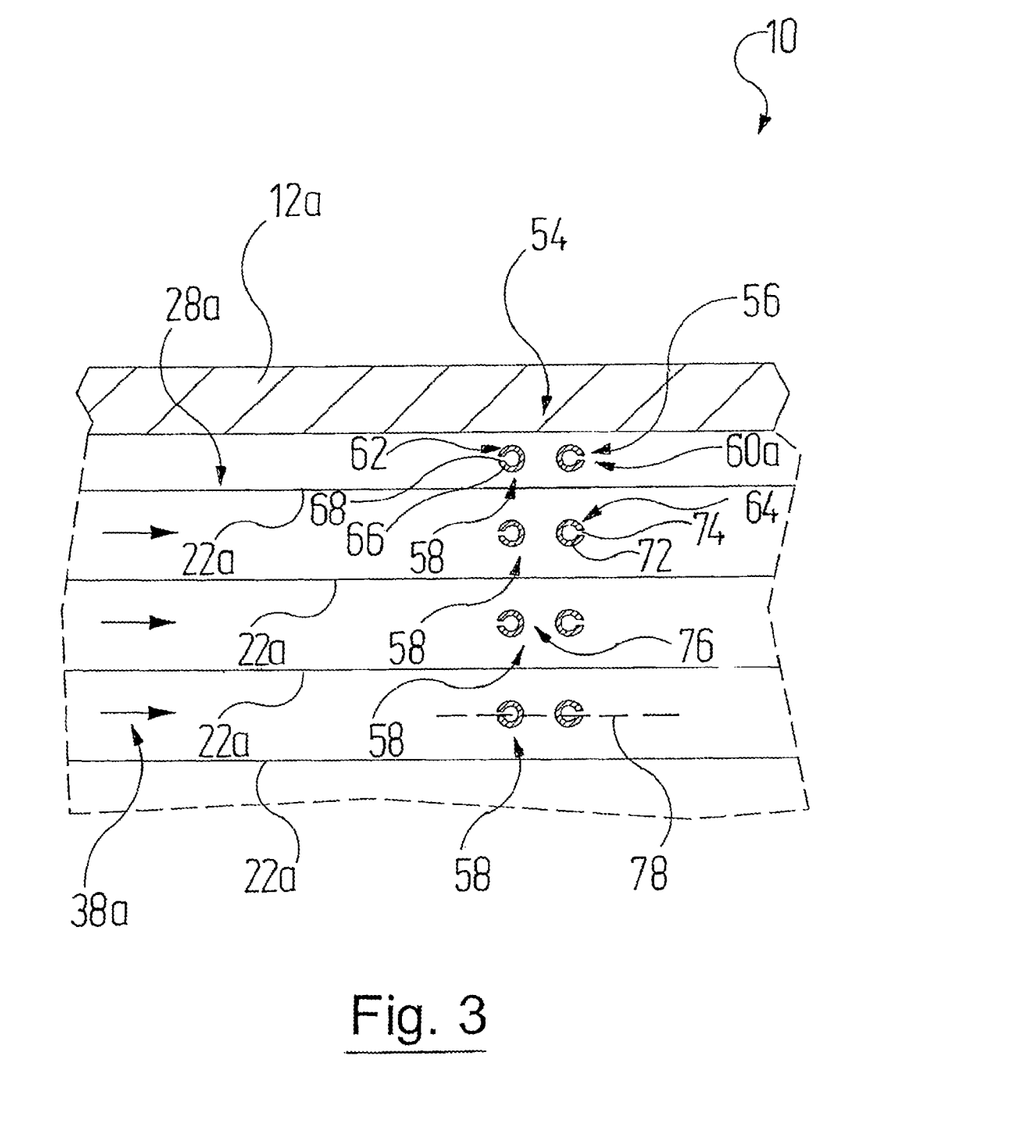
FIG. 3 shows an enlarged detail of FIG. 1, with the differential-pressure sensor installation of FIG. 2.

FIGS. 2 and 3 visualize differential-pressure sensor installations 60a according to a first exemplary embodiment of the differential-pressure sensor installations 60, wherein in each case part of the process chamber portion 28a is shown, and only the sensor assembly 54 of the flow measurement system 52 is shown in FIG. 2. The differential-pressure sensor installations 60a each comprises one pitot probe 62 and one probe 64 for the static pressure; only one differential-pressure sensor installation 60a is provided with further reference signs.

The pitot probe 62 as a pitot tube 66 has an elongated hollow tube that in the sensor region 58 extends between two fiber carpets 22a so as to be transverse to the main flow direction of the air stream 38a to be measured.

The pitot tube 66 in the longitudinal direction at regular spacings has openings 68 which are disposed on a straight line. The pitot tube 66 is aligned such that these openings 68 point in a direction counter to the main flow direction of the air stream 38a. The pitot tube 66 is closed at one end 66a. The back pressure $P_1$ prevalent at the opposite measurement end 66b of the pitot tube 66 is determined with the aid of a pressure measurement unit 70 which is indicated only schematically as a sensing element. The pressure that is prevalent at the measurement end 66a of the pitot tube 66, for physical reasons that are known per se, is the mean value of the pressures across the longitudinal extent of the pitot tube 66.

The probe 64 for the static pressure in turn as a reference tube 72 comprises an elongated hollow pressure tube, which in terms of construction is identical to the pitot tube 66 and has openings 74 that are correspondingly disposed. The reference tube 72 runs between two fiber carpets 22a, while maintaining a predefined measurement spacing 76 from the tube 66, so as to be parallel in relation thereto, of the pitot probe 62, and thus likewise so as to be horizontal and transverse in relation to the main flow direction of the air stream 38a to be measured. The reference tube 72 in the main flow direction of the air stream 38a is disposed behind the pitot tube 66, and is aligned such that the openings 74 of said reference tube 72 point away from the pitot tube 66.

Figure 5:
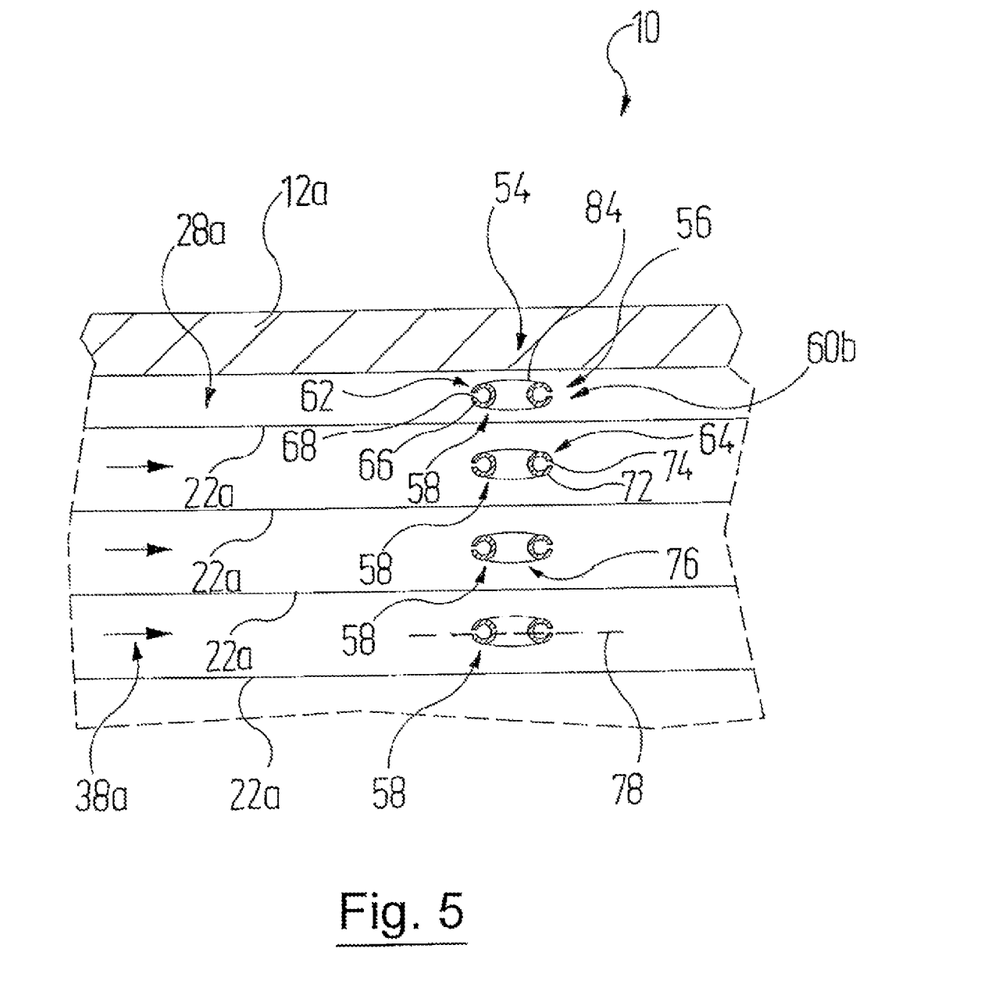
FIG. 5 shows an enlarged detail of FIG. 1 corresponding to that of FIG. 3, with the differential-pressure sensor installation of FIG. 4.

The two tubes 66 and 72 collectively define a measurement plane 78 which runs parallel with the main flow direction of the air stream 38a, and is only indicated in FIGS. 1, 3 and 5. Consquently, the measurement plane 78 in the present exemplary embodiment runs horizontally.

The reference tube 72 is closed at one end 72a. The static reference pressure $P_2$ prevalent at the opposite measurement end 72b of the reference tube 72 is detected by means of a pressure measurement unit 76 which here is likewise only schematically visualized as a sensing element. The pressure prevalent at the measurement end 72b of the reference tube 72 also mirrors the mean value of the pressures across the longitudinal extent of the reference tube 72.

The mean flow velocity of the air stream 38a in relation to a measurement section 82 in the process chamber portion 28a may be computed with the aid of known calculation algorithms from the difference between the back pressure $P_1$ and the static pressure $P_2$. The measurement section 82 depends on the length of the pitot tube 66 and of the reference tube 72, and in the case of the present examplary embodiment corresponds to the width of the process chamber portion 28a.

In this way, the flow velocities of the operating atmosphere 38 in the vertical direction in the respective sensor regions 58 between the fiber carpets 22a may be detected and be combined so as to form an overall flow profile.

According to FIG. 1, a sensor region 58 having one differential-pressure sensor installation 60 is located between all planes of the fiber carpets 22a. However, the number of said sensor regions 58 may also be less, and one sensor region 58, when viewed in the vertical direction, may also be defined only in every second or third intermediate space between two adjacent fiber carpets 22a, for example.

Figure 4:
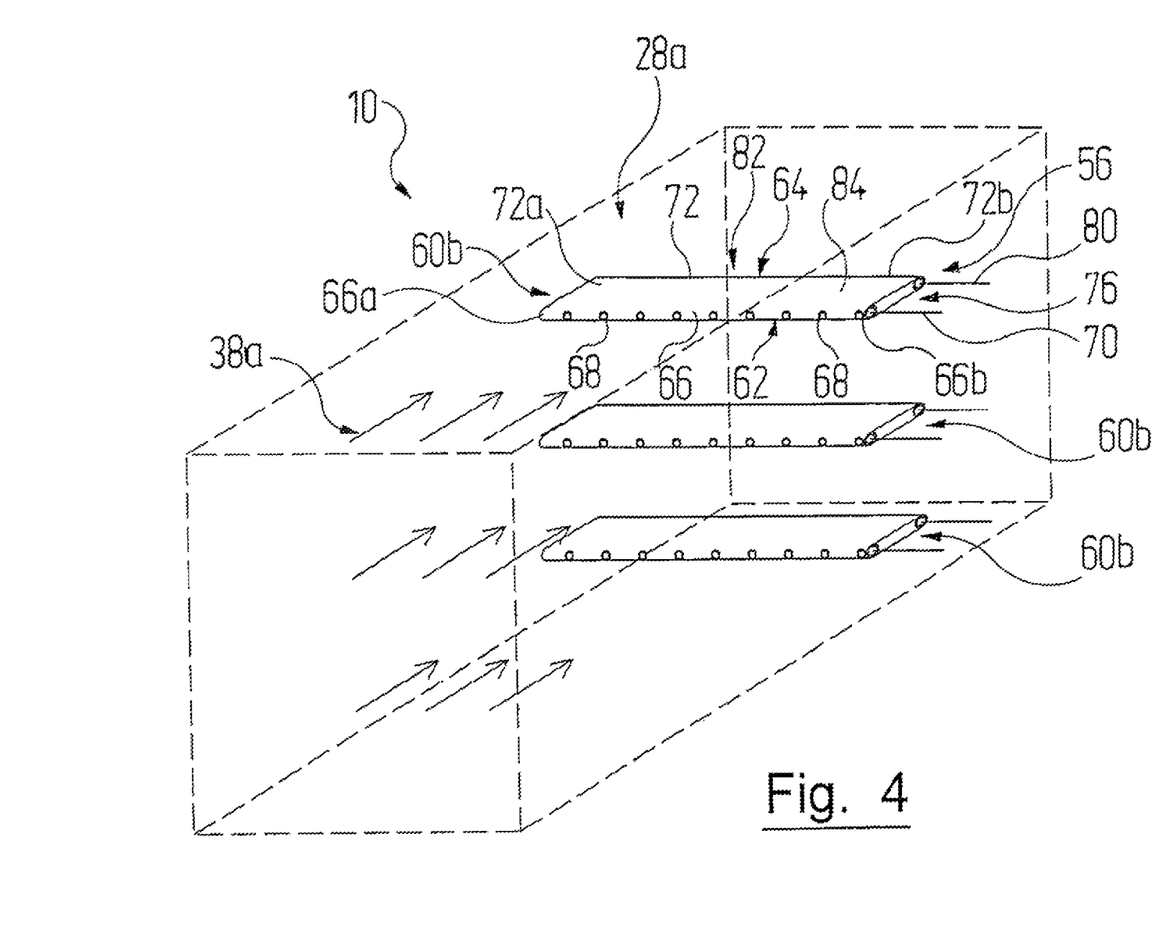
FIG. 4 shows a perspective fragment of a detail of the sensor assembly of the oxidation furnace, having differential-pressure sensor installations according to a second exemplary embodiment.

FIGS. 4 and 5 visualize differential-pressure sensor installations 60b as a second exemplary embodiment of the differential-pressure sensor installations 60. As opposed to a differential-pressure sensor installation 60a, a differential-pressure sensor installation 60b comprises an encapsulation 84 which, except for the openings 68 and 74, respectively, shrouds the respective pitot tube 66 of the pitot probe 62, and the reference tube 72 of the probe 64 for the static pressure, such that the intermediate space between the pitot tube 66 and the reference tube 72 is not reached by the air stream 38a. On account thereof, the flow on the differential-pressure sensor installation 60b is homogenized, and turbulences are reduced. This contributes toward a more homogeneous heating behavior of the oxidation furnace 10.

As can be seen in FIG. 5, the differential-pressure sensor installation 60b by virtue of the encapsulation 84 has an external contour that is oval in the cross section.

Figure 6:
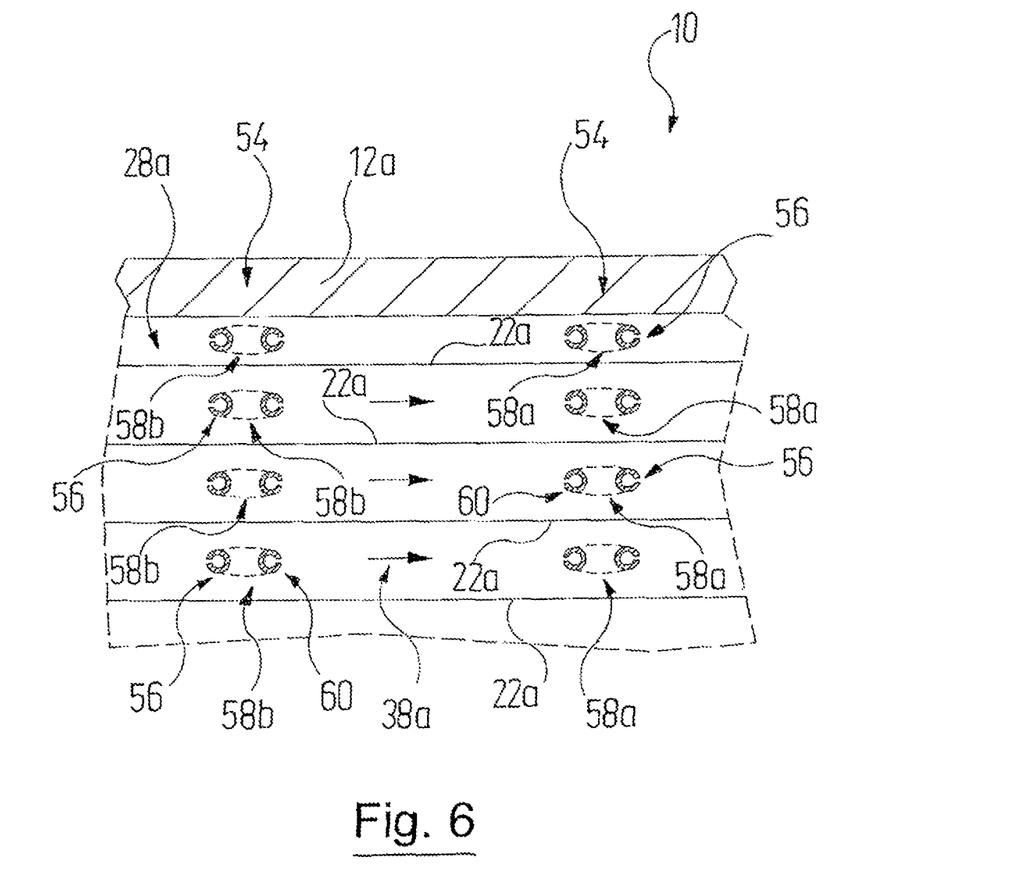
FIG. 6 shows an enlarged detail of FIG. 1 corresponding to FIGS. 3 and 5, with a modified sensor assembly.

FIG. 6 shows a modification in which two adjacent sensor zones 58a, 58b of the sensor region 58 are defined in each intermediate space between two adjacent fiber carpets 22a, one sensor installation 56 being disposed in each of said sensor zones 58a, 58b. This herein may be the differential-pressure sensor installations 60a or 60b, or else the alternative exemplary embodiment of a differential-pressure sensor installation 86, explained hereunder in the context of FIG. 8, having the variants that are visualized in FIGS. 9 to 12. This is also indicated in FIG. 6 and FIG. 7 in that the encapsulation therein is only indicated with dashed lines.

In general, more than two sensor installations 56 may also be disposed between two adjacent fiber carpets 22a in the main flow direction of the air stream 38a. The more sensor installations 56 present, the finer the resolution at which the flow profile in the main flow direction of the air stream 38a may be established.

Figure 7:
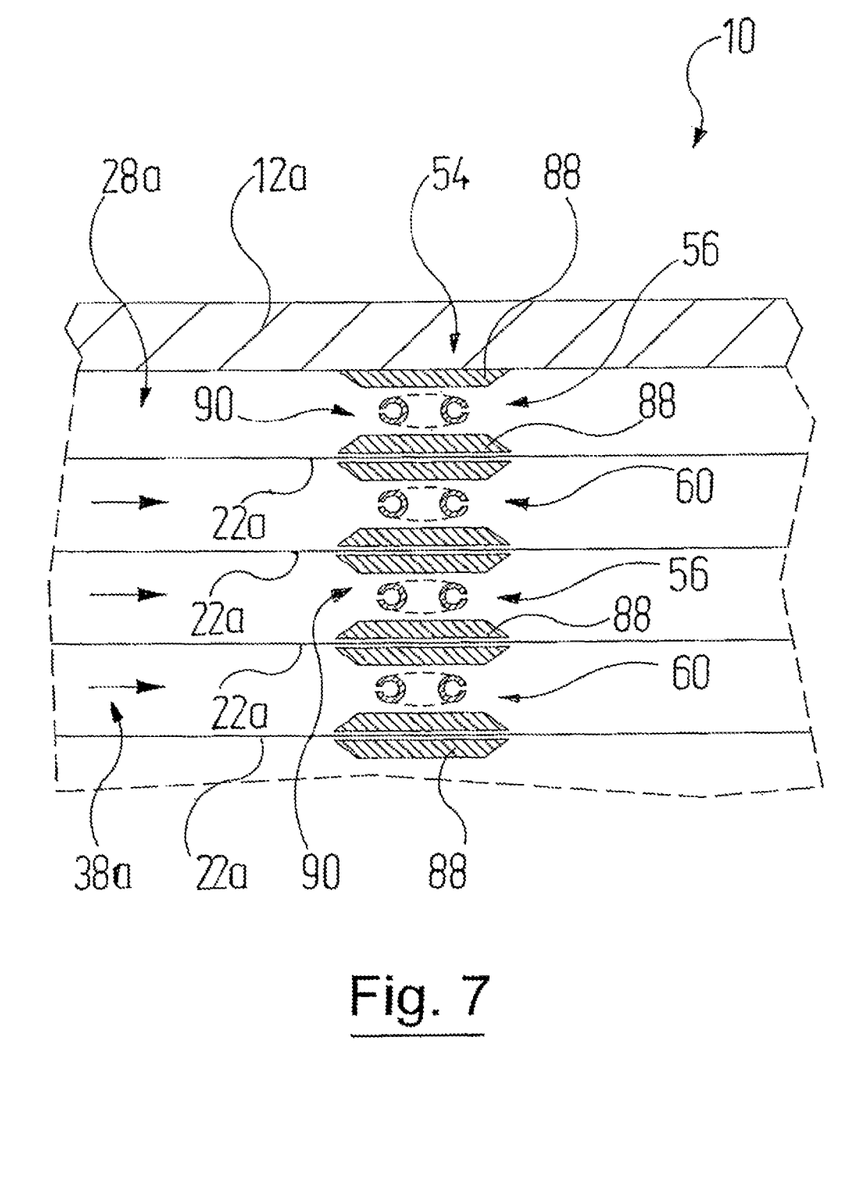
FIG. 7 shows an enlarged detail of FIG. 1 corresponding to FIGS. 3, 5, and 6, wherein the sensor assembly comprises flow directing elements.

A modification, in which air directing elements 88, by way of which the air stream 38a is bundled in the direction toward the sensor installation 56, are present in the sensor region 58 between two adjacent fiber carpets 22a, is shown in FIG. 7.

The air directing elements 88 predefine an inflow path 90 which tapers off in the direction toward the sensor installation 56, and is funnel-shaped in the cross section. On account thereof, turbulences on the respective pitot tube 66 and behind the reference tube 72 are likewise reduced.

A vertical flow profile of the operating atmosphere 38, or of the air streams 38a and 38b in the process chamber portions 28a and 28b, respectively, may be established with the aid of the sensor assembly 56, as explained above, having the differential-pressure sensor installations 60a or 60b. A distinction between dissimilar flow velocities of the air streams 38a, 38b is not possible there in the horizontal direction.

Figure 8:
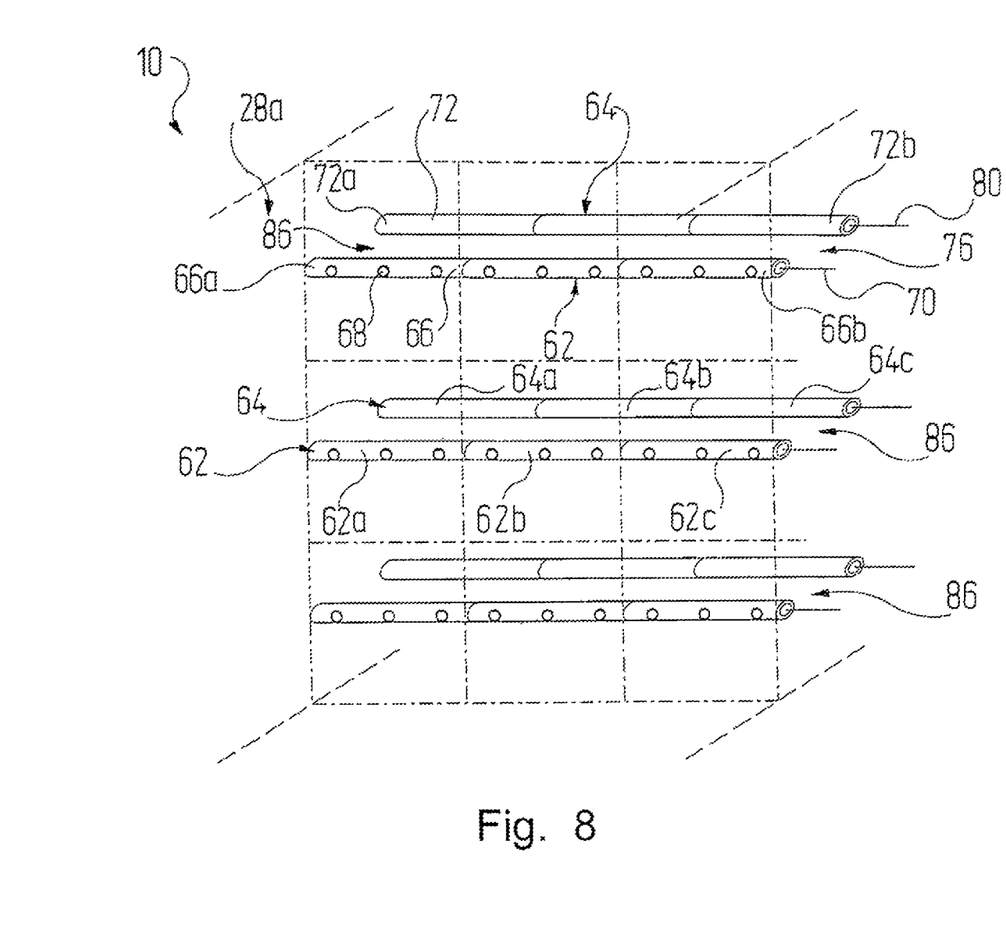
FIG. 8 shows a perspective fragment of a detail, corresponding to FIGS. 2 and 4, of a sensor assembly which comprises differential-pressure sensor installations by way of which flow differentials that are transverse to the flow direction are detectable.

As a further modification of the sensor installations 56, FIG. 8 shows a plurality of differential-pressure sensor installations 86 by way of which dissimilar flow velocities of the operating atmosphere 38 in the sensor region 58 that are transverse to the main flow direction may also be detected, such that a flow profile may also be established in this direction. Overall, a grid-based flow profile across the cross section of the oxidation furnace 10 right across the sensor regions 58 may thus be established.

Figure 9:
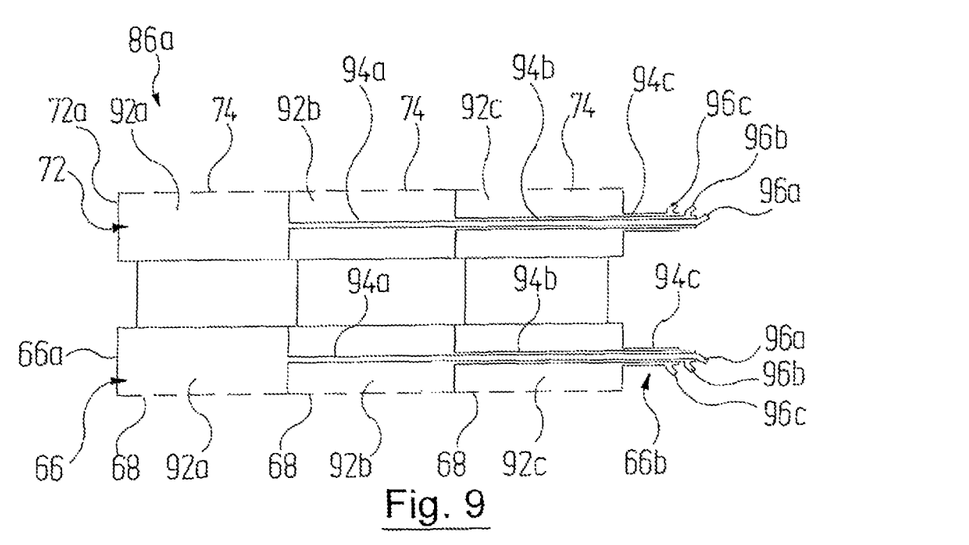
FIGS. 9 to 12 show four exemplary embodiments of differential-pressure sensor installations for this sensor assembly.
Figure 10:
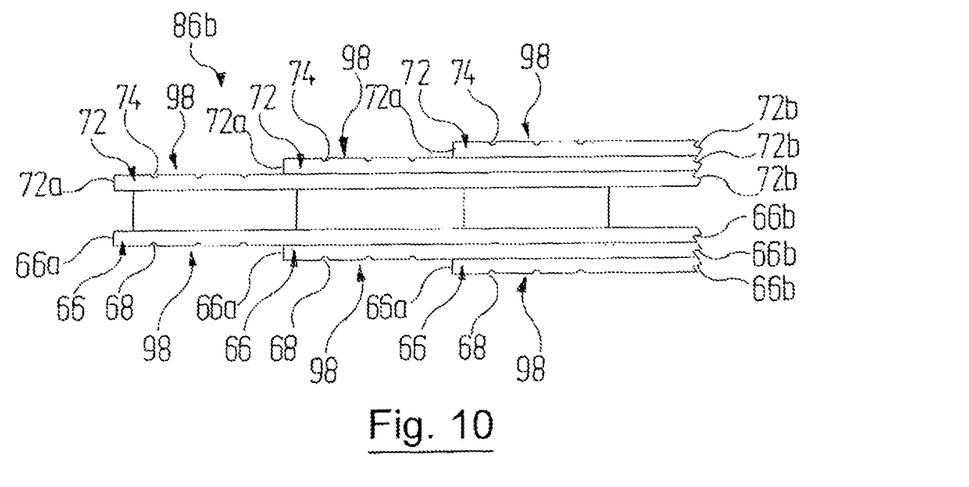
Figure 11:
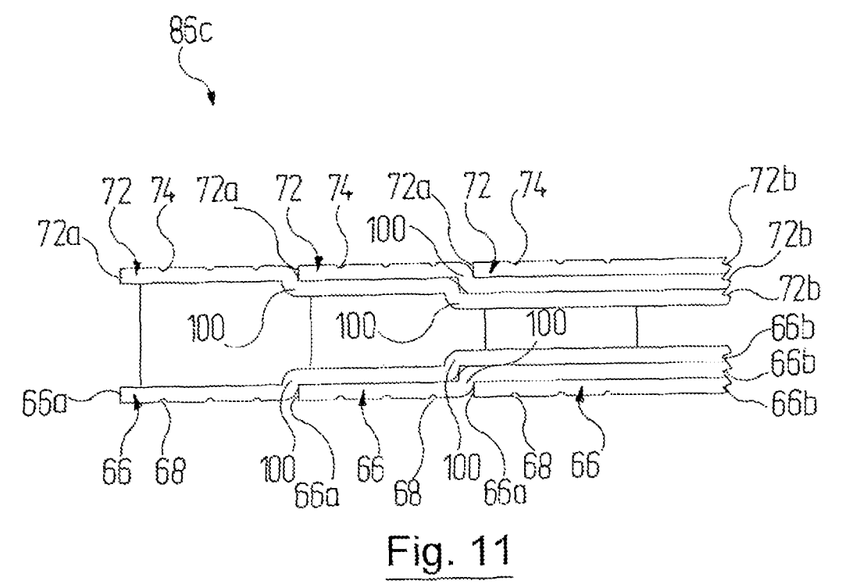

The pitot probe 62 therein comprises three measurement portions 62a, 62b, 62c which interact with three measurement portions 64a, 64b, 64c of the probe 64 for the static pressure; four exemplary embodiments of such a differential-pressure sensor installation 86 are visualized in FIGS. 9 to 11, and are identified with 86a, 86b, 86c, and 86d, respectively. Hereunder, the respective pitot tube 66 of the respectively present pitot probe 62 is explained in each case. The reference tube 72 of the respective probe 64 for the static pressure is in each case configured so as to be of identical construction. In terms of the arrangement, positioning, and alignment of the pitot tubes 66, or of the reference tubes 72, respectively, of the differential-pressure sensor installations 86 in the process chamber 28 of the oxidation furnace 10, the statements pertaining to the differential-pressure sensor installations 60 otherwise analogously apply in a corresponding manner.

In the case of the differential-pressure sensor installation 86a according to FIG. 9, the pitot tube 66, from the closed end 66a to the measurement end 66b, is subdivided into a plurality of measurement chambers 92, wherein three measurement chambers 92a, 92b, 92c are provided in the case of the present exemplary embodiment. Each of said measurement chambers 92*a*, 92*b*, 92*c*, at that end side thereof that is remote from the closed end 66*a*, by way of a hollow line 94*a*, 94*b*, 94*c* open into measurement connectors 96 in the form of presently three measurement connectors 96*a*, 96*b*, 96*c* at the measurement end 66*b* of the pitot tube 66, one pressure measurement unit 70 being connectable to each of said measurement connectors 96*a*, 96*b*, 96*c*.

The hollow lines 94*a*, 94*b*, 94*c* are disposed so as to be mutually coaxial and coaxial with the measurement chambers 92*a*, 92*b*, 92*c*, such that the hollow line 94*a* of the first measurement chamber 92*a* runs through the second measurement chamber 92*b* and through the third measurement chamber 92*c*, and the hollow line 94*b* of the second measurement chamber 92*b* extends through the third measurement chamber 92*c* and therein is surrounded by the hollow line 94*a* of the first measurement chamber 92*a*. Finally, the hollow line 94*c* of the third measurement chamber 92*c* surrounds the hollow lines 94*a* and 94*b* which run inside one another.

A plurality of openings 68 are present along each measurement chamber 92*a*, 92*b*, 92*c*. The pressure measured at each measurement connector 96*a*, 96*b*, 96*c* is the mean pressure of the operating atmosphere 38 across the extent of the respective measurement chamber 92*a*, 92*b*, or 92*c*, respectively. Two measurement chambers 92 of the pitot tube 66 and of the reference tube 72 that are disposed in sequence in the main flow direction of the operating atmosphere 38 form one measurement chamber pair; the pressures thereof that are measured at the respective measurement connector 96 are correlated in a corresponding manner.

In consequence, a flow profile of the operating atmosphere 38 that is transverse to the main flow direction may also be detected in this way. The more measurement chambers 92 present, the finer the resolution at which the flow profile establishes the flow conditions in the sensor region 58 in the direction that is transverse to the main flow direction.

Figure 12:
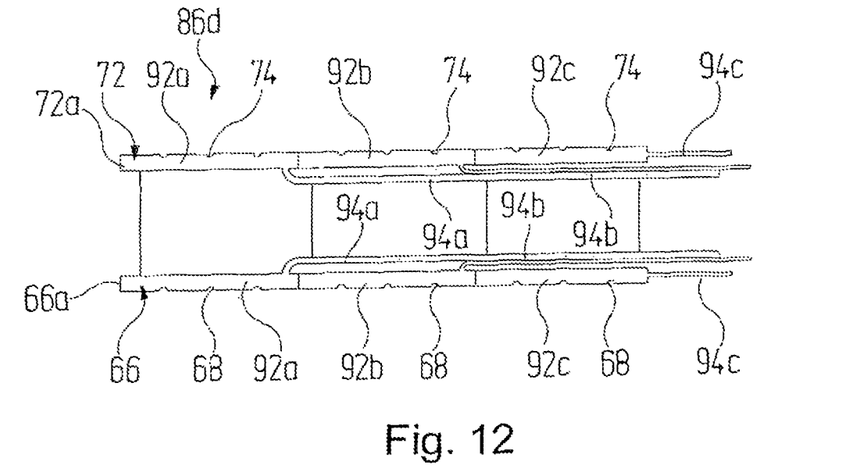

Pitot tubes 66 and reference tubes 72 are shown to another scale or having another cross section, respectively, in FIGS. 10 to 12.

FIG. 10 shows a differential-pressure sensor installation 86*b* in which a plurality of rectilinear pitot tubes 66 are present that are of dissimilar length and are disposed so as to bear on one another in the measurement plane 78 in such a manner that in each case one measurement portion 98 lies at the closed end 66*b* of the respective pitot tube 66 having openings 68 in the process chamber 28.

In the same way, a plurality of reference tubes 72 of dissimilar length, having such measurement portions 98, are present. Two measurement portions 98 of a pitot tube 66 and of a reference tube 72 that are disposed in sequence in the main flow direction of the operating atmosphere 38 form one measurement portion pair; the pressures thereof that are measured at the respective measurement end 66*a* or 72*a*, respectively, are correlated in a corresponding manner.

At the transition points from one pitot tube 66 to the next the closed end 66*a* of a pitot tube 66 is in each case configured as a step, as can be readily seen in FIG. 10.

In the case of the exemplary embodiment of the differential-pressure sensor installation 86*c* according to FIG. 11, instead of rectilinear pitot tubes 66 and reference tubes 72, again tubes of dissimilar length but running in a stepped manner, having steps 100 and step portions 102, are present, in which tubes a measurement portion 98 is configured at each of the closed ends 66*a* and 72*a*, respectively.

As can be seen from FIG. 11, the tubes 66 or 72, respectively, by virtue of the stepped configuration may be disposed so as to bear on one another in such a manner that the air stream 38*a* is offered a largely uniform impact face which is predefined by the individual measurement portions 98 of the various tubes 66 or 72, respectively.

As a further modification, a differential-pressure sensor installation 86*d* having measurement chambers 92 and hollow lines 94 is shown in FIG. 12. There, the hollow lines 94 do not run from the measuring chambers 92 at the end side, and do not lie so as to be mutually coaxial. Rather, the hollow lines 94 run parallel with the pitot tube 66 or with the reference tube 72, respectively, and open laterally into the respective measurement chamber 92.

If and when each measurement end 66*b*, 72*b* of each pitot tube 66 and of each reference tube 72 of the differential-pressure sensor installations 60 or 86 is connected to a dedicated pressure measurement unit 70 or 80, respectively, the operating atmosphere 38 during the oxidation operation of the oxidation furnace 10 may be monitored in real time.

Figure 13:
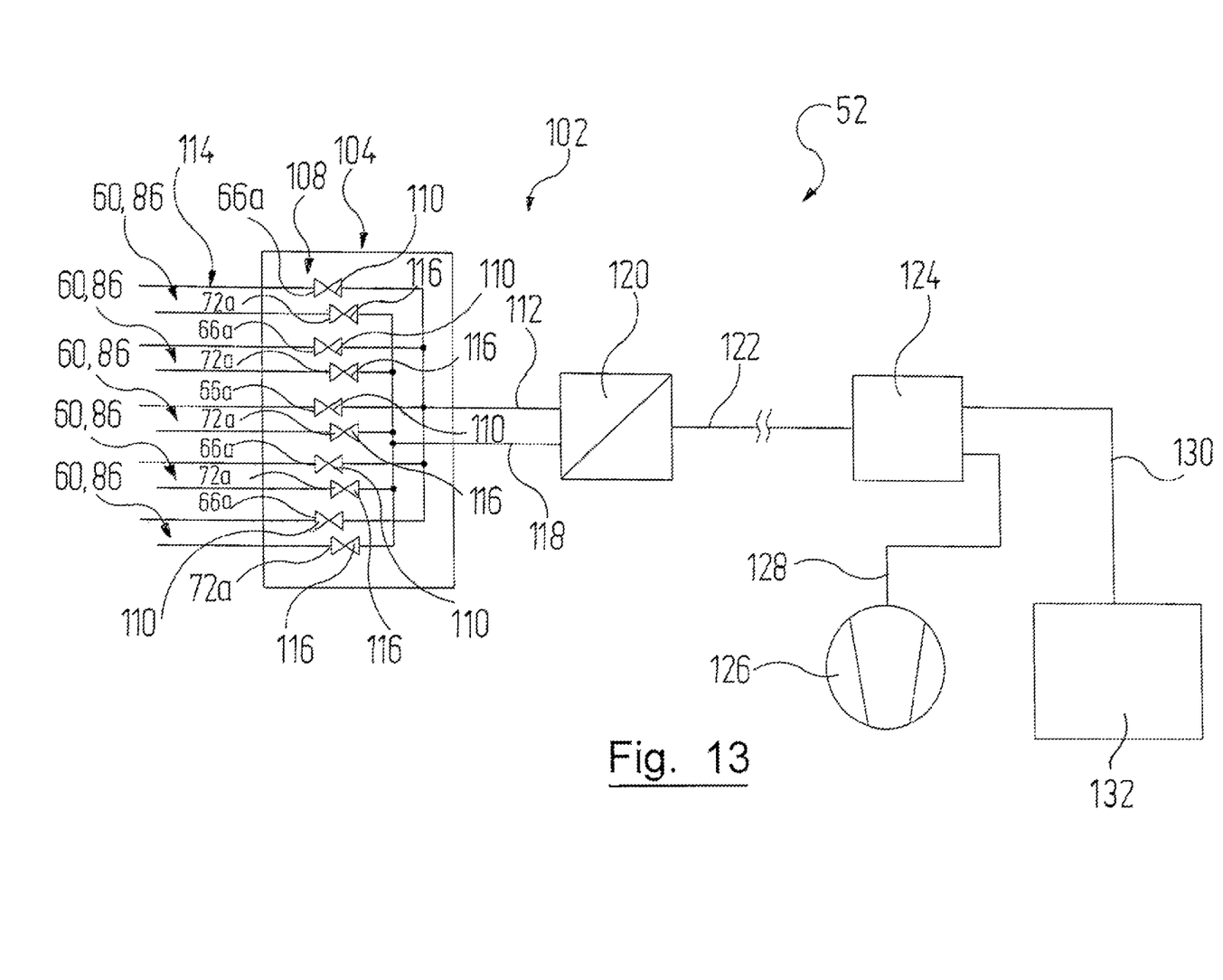
FIG. 13 schematically shows a control circuit for sequentially detecting measurement regions in the oxidation furnace.

However, the constructive effort and the number of required pressure measurement units 70, 80 are accordingly high. FIG. 13 shows a flow measurement system 52 in which a group measurement unit 102 by way of a valve installation 104 is connected to a plurality of differential-pressure sensor installations 60 or 86, respectively, which may be sequentially evaluated by the group measurement unit 102. In this way, a flow profile of the operating atmosphere 38 in the oxidation furnace 10 may be periodically established. This typically suffices in order for variations in the flow pattern to be rapidly identified and for the blower installation 40 and the suction installations 42 to be swiftly set in a corresponding manner until the desired flow profile has been built up.

The valve installation 104 by way of valves 110 connects the measurement ends 66*b* of the pitot tubes 66 of a pitot tube group 108 to a back pressure line 112, and by way of valves 116 connects the measurement ends 72*b* of the reference tubes 72 of a reference tube group 114 to a reference pressure line 118.

The back pressure line 112 and the reference pressure line 118 lead to a transducer 120 which converts the detected pressure to an electric signal, transmitting the latter by way of a signal line 122 to a controller 124. The controller 124 computes the flow profile of the operating atmosphere 38 in the oxidation furnace 10, and compares the measured actual flow profile with a stored nominal flow profile. In the case of deviations from the nominal flow profile, the controller 124 controls the air supply of the oxidation furnace 10, this in an exemplary manner being visualized by a fan 126 which by way of a control line 128 is connected to the controller. In this way, a closed loop control circuit is configured by way of which immediate reaction to identified deviations from a nominal flow profile and setting of the flow of the operating atmosphere 38 is enabled.

Moreover, the controller 124 by way of a data line 130 is connected to a display 132 on which the monitoring of the operating atmosphere 38 in the oxidation furnace 10 may be visualized. To this end, a measured flow profile and a predefined nominal flow profile may be graphically reproduced and thus be compared by an operator, for example.

Now the valves 110 and 116 of a pair of pitot/reference tubes of a differential-pressure sensor installation 60 or 86 are in each case opened sequentially; the other valves 110, 116 are in each case closed. The pressures at the measurement ends 66*b*, 72*b* of the associated pitot tube 66 or reference tube 72, respectively, may then be detected.

In the case of a modification (not shown per se), the control signals may also be utilized for automatically adjusting supply air or exhaust air openings within or outside the process chamber. Depending on the determined flow profile, the supply air and exhaust air openings may be locally narrowed or widened, for example by regulating flaps, such that a homogeneous flow pattern is maintained across the furnace cross section.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. An oxidation furnace for the oxidative treatment of fibers comprising:
   a) a housing which except for passage regions for fibers is gas tight;
   b) a process chamber which is located in the interior of the housing;
   c) an atmosphere generating installation comprising a plurality of blower boxes and a plurality of suction boxes and by way of which a hot operating atmosphere is generatable and capable of being blown into the process chamber, which hot operating atmosphere under process conditions perfuses the process chamber in a main flow direction;
   d) deflection rollers which guide the fibers in a serpentine manner such that they lie beside one another in the form of a fiber carpet through the process chamber, wherein the fiber carpet defines a plane between respective mutually opposite deflection rollers;
   wherein
   e) a flow measurement system is present by means of which under process conditions a flow profile of the operating atmosphere is establishable and which for determining a flow velocity comprises at least one sensor installation which is disposed in a sensor region between two adjacent fiber carpets and the plurality of blower boxes and the plurality of suction boxes, the at least one sensor installation being a differential-pressure sensor installation and arranged such that the two adjacent carpet fibers are exposed to and engaged by the hot operating atmosphere along an entire distance between the plurality of blower boxes and the plurality of suctions boxes.

2. The oxidation furnace as claimed in claim 1, wherein the at least one sensor installation is adapted in such a manner that dissimilar flow velocities of the hot operating atmosphere in the sensor region that are transverse to the main flow direction are detected.

3. The oxidation furnace as claimed in claim 1, wherein the differential-pressure sensor installation comprises a pitot probe and a probe for static pressure.

4. The oxidation furnace as claimed in claim 3, wherein
   a) the pitot probe comprises at least one pitot tube having a closed end and a measurement end, and the probe for static pressure comprises at least one reference tube having a closed end and a measurement end, wherein a back pressure ($P_1$) and a static reference pressure ($P_2$) are detectable at the measurement ends;
   b) the at least one pitot tube and the at least one reference tube in the sensor region extend so as to be transverse to the main flow direction of the hot operating atmosphere and so as to be mutually parallel at a measurement spacing;
   c) the at least one pitot tube has openings and is disposed such that the openings point in the direction that is counter to the main flow direction of the hot operating atmosphere;
   d) the at least one reference tube has openings and in the main flow direction of the hot operating atmosphere is disposed behind the at least one pitot tube such that the openings of the at least one reference tube point away from the at least one pitot tube and with the main flow direction under process conditions.

5. The oxidation furnace as claimed in claim 4, wherein the differential-pressure sensor installation comprises an encapsulation which shrouds the at least one pitot tube and the at least one reference tube, except for the openings of the at least one pilot tube and the openings of the at least one reference tube.

6. The oxidation furnace as claimed in claim 4, wherein the pitot probe comprises a plurality of measurement portions, and the probe for static pressure comprises a plurality of measurement portions.

7. The oxidation furnace as claimed in claim 6, wherein the at least one pitot tube comprises a plurality of measurement chambers and the at the at least one reference tube comprises a plurality of measurement chambers, the plurality of measurement portions of the pitot probe comprising the plurality of measurement chambers of the at least one pitot tube and the plurality of measurement portions of the probe for the static pressure comprising the plurality of measurement chambers of the at least one reference tube, wherein each measurement chamber is connected to a measurement connector at the measurement end of the respective tube by a hollow line.

8. The oxidation furnace as claimed in claim 7, wherein the hollow lines in each tube run in a manner that is mutually coaxial and coaxial with the measurement chambers.

9. The oxidation furnace as claimed in claim 6, further comprising a plurality of pitot tubes which includes the at least one pitot tube, or of reference tubes which include the at least one reference tube, are present, the plurality of pilot tubes or of reference tubes being of dissimilar length and disposed adjacent one another so that one measurement portion from the plurality of measurement portions is formed proximate the closed end of each tube and extends along a portion of the tube which includes openings which are exposed to the process chamber.

10. The oxidation furnace as claimed in claim 9, wherein the plurality of pitot tubes or of reference tubes are rectilinear or angular.

11. The oxidation furnace as claimed in claim 1, wherein the flow measurement system comprises at least one sensor assembly which comprises a plurality of sensor installations which includes the at least one sensor installation, the plurality of sensor installations being disposed in a plurality of sensor regions between dissimilar adjacent fiber carpets.

12. The oxidation furnace as claimed in claim 1, wherein the flow measurement system comprises at least one sensor assembly which comprises a plurality of sensor installations which includes the at least one sensor installation, the plurality of sensor installations being disposed in adjacent sensor zones of one sensor region.

13. The oxidation furnace as claimed in claim 11, wherein the plurality of sensor installations are connected to a group measurement unit by a valve installation, the plurality of sensor installations being sequentially evaluatable.

14. The oxidation furnace as claimed in claim 1, wherein the process chamber has a plurality of process chamber portions in which the hot operating atmosphere flows with dissimilar main flow directions, wherein the flow profile of each of the latter is separately establishable by the flow measurement system.

15. The oxidation furnace as claimed in claim 1, wherein air directing elements by way of which the hot operating atmosphere is guided in the direction toward the sensor installation are disposed in a sensor region between two adjacent fiber carpets.

16. The oxidation furnace as claimed in claim 12, wherein the plurality of sensor installations are connected to a group measurement unit by a valve installation, the plurality of sensor installations being sequentially evaluatable.

17. An oxidation furnace for the oxidative treatment of fibers comprising:
   a) a housing which except for passage regions for fibers is gas tight;
   b) a process chamber which is located in the interior of the housing;
   c) an atmosphere generating installation by way of which a hot operating atmosphere is generatable and capable of being blown into the process chamber in a flow direction, which hot operating atmosphere under process conditions perfuses the process chamber in a main flow direction;
   d) deflection rollers which guide the fibers in a serpentine manner such that they lie beside one another in the form of a fiber carpet through the process chamber, wherein the fiber carpet defines a plane between respective mutually opposite deflection rollers;
   wherein
   e) a flow measurement system is present by means of which under process conditions a flow profile of the operating atmosphere is establishable and which for determining the flow velocity in both the flow direction and in a direction transverse to the flow direction, the flow measurement system comprising at least one sensor installation which is disposed in a sensor region between two adjacent fiber carpets, wherein measured flow data captured by the at least one sensor installation is provided to a controller which generates the flow profile and controls a rate of air supplied to the process chamber to control the atmosphere in the process chamber based on the calculated flow profile.

18. The oxidation furnace of claim 17, wherein the flow measurement assembly comprises at least one differential-pressure sensor installation comprising a pitot tube and a reference tube which define a measurement plane which is parallel to the main flow direction under process conditions, wherein the measurement plane extends through the at least one opening of the pitot tube and the at least one opening of the reference tube.

19. An oxidation furnace for the oxidative treatment of fibers comprising:
   a) a housing, which except for passage regions for fibers is gas tight;
   b) a process chamber which is located in the interior of the housing;
   c) an atmosphere generating installation which generates and blows a hot operating atmosphere into the process chamber, the hot operating atmosphere being blown into the process chamber in a main flow direction under process conditions;
   d) deflection rollers which guide the fibers in a serpentine manner such that they lie beside one another in the form of a fiber carpet through the process chamber, wherein the fiber carpet defines a plane between respective mutually opposite deflection rollers;
   e) a flow measurement system for establishing a flow profile of the operating atmosphere under process conditions, the flow measurement system comprising at least one differential-pressure sensor, the at least one differential-pressure sensor comprising a plurality of pitot tubes each having a measurement portion, and a plurality of reference tubes each having a measurement portion, the measurement portion of the plurality of pitot tubes and the measurement of the plurality of reference tubes extending across a portion of the process chamber in a direction transverse to the main flow direction under process conditions, the plurality of pitot tubes and the plurality of reference tubes being spatially separated, wherein
      a. the plurality of pitot tubes being of dissimilar length and disposed adjacent one another so that the measurement portion of each pitot tube is arranged adjacent the measurement portion of at least one other pitot tube and are aligned in a direction counter to the main flow direction under process conditions; and
      b. the plurality of reference tubes being of dissimilar length and disposed adjacent one another so that the measurement portion of each reference tube is arranged adjacent the measurement portion of at least one other reference tube and are aligned with the main flow direction under process conditions.

20. The oxidation furnace of claim 19, further comprising a plurality of differential-pressure sensors, wherein at least one differential-pressure sensor is positioned between each adjacent fiber carpet.

\* \* \* \* \*